(12) United States Patent
García Calatrava et al.

(10) Patent No.: US 12,130,793 B2
(45) Date of Patent: Oct. 29, 2024

(54) METHOD FOR OPTIMIZING THE MANAGEMENT OF A FLOW OF DATA

(71) Applicants: BARCELONA SUPERCOMPUTING CENTER-CENTRO NACIONAL DE SUPERCOMPUTACIÓN, Barcelona (ES); UNIVERSITAT POLITÈCNICA DE CATALUNYA, Barcelona (ES)

(72) Inventors: Carlos García Calatrava, Barcelona (ES); Yolanda Becerra, Sant Joan Despí (ES); Fernando Cucchietti, Castelldefels (ES)

(73) Assignees: BARCELONA SUPERCOMPUTING CENTER-CENTRO NACIONAL DE SUPERCOMPUTACION, Barcelona (ES); UNIVERSITAT POLITÈCNICA DE CATALUNYA, Barcelona (ES)

( * ) Notice: Subject to any disclaimer, the term of this patent is extended or adjusted under 35 U.S.C. 154(b) by 0 days.

(21) Appl. No.: 18/120,178

(22) Filed: Mar. 10, 2023

(65) Prior Publication Data

US 2023/0418800 A1    Dec. 28, 2023

(51) Int. Cl.
*G06F 17/30* (2006.01)
*G06F 16/22* (2019.01)
*G06F 16/28* (2019.01)

(52) U.S. Cl.
CPC ........ *G06F 16/2282* (2019.01); *G06F 16/221* (2019.01); *G06F 16/284* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | | |
|---|---|---|---|---|
| 8,069,190 B2 * | 11/2011 | McColl | ............... | G06F 16/2465 707/810 |
| 8,214,372 B2 * | 7/2012 | Gupta | ................. | G06F 9/44505 707/769 |
| 10,503,498 B2 * | 12/2019 | Leonard | .................... | G06F 8/76 |
| 10,984,017 B1 * | 4/2021 | Gilderman | .......... | G06F 16/2379 |

(Continued)

OTHER PUBLICATIONS

Eugene Siow, "Efficient Querying for Analytics on Internet of Things Databases and Streams", Thesis, 2018, 1-255, University of Southampton.

*Primary Examiner* — Hung D Le
(74) *Attorney, Agent, or Firm* — Hayes Soloway P.C.

(57) ABSTRACT

A method is used for managing a flow of data in at least one database, wherein said database is configured with at least two data models of data storage. In said method, during a first period of time, a first data flow portion is received in a computer, and the first data flow portion is then stored in a first data pool of the database according to the first data model. Then, after the first period of time, a transformation is made on the first portion of the data and the transformed first data is assigned to a second data model, and the first data flow portion is then transferred from the first data pool to a second data pool. The process is repeated with at least a second data flow portion and can be extended to more transformations, and, thus, to more data models, and more data pools accordingly.

14 Claims, 11 Drawing Sheets

(56) References Cited

U.S. PATENT DOCUMENTS

| | | | | |
|---|---|---|---|---|
| 11,151,081 | B1* | 10/2021 | Anand | G06F 16/13 |
| 11,461,347 | B1* | 10/2022 | Das | G06F 16/2433 |
| 11,468,368 | B2* | 10/2022 | Crabtree | G06Q 40/06 |
| 11,625,181 | B1* | 4/2023 | Bernat | G06F 3/0644 |
| | | | | 711/154 |
| 11,853,656 | B1* | 12/2023 | Naamad | G06F 30/20 |
| 2016/0063080 | A1* | 3/2016 | Nano | G06F 16/254 |
| | | | | 707/602 |
| 2016/0314212 | A1* | 10/2016 | Menday | G06F 16/24522 |
| 2016/0321277 | A1* | 11/2016 | Costabello | G06F 16/122 |
| 2018/0046412 | A1* | 2/2018 | Sabloniere | G06F 3/061 |
| 2018/0069925 | A1* | 3/2018 | Lavasani | G06F 16/28 |
| 2019/0286440 | A1* | 9/2019 | Leonard | G06F 8/60 |
| 2020/0218464 | A1* | 7/2020 | Patil | G06F 3/0649 |
| 2020/0389495 | A1* | 12/2020 | Crabtree | G06F 16/2477 |
| 2021/0240347 | A1* | 8/2021 | Lee | G06F 3/0649 |
| 2021/0373761 | A1* | 12/2021 | Karr | G06F 3/0614 |
| 2022/0043594 | A1* | 2/2022 | Idicula | G06F 3/0683 |
| 2022/0066882 | A1* | 3/2022 | Wang | G06F 12/0253 |
| 2022/0129501 | A1* | 4/2022 | Patel | G06F 11/1464 |
| 2022/0138156 | A1* | 5/2022 | Wang | H04L 67/10 |
| | | | | 707/740 |
| 2022/0171792 | A1* | 6/2022 | Saxena | G06F 16/2365 |
| 2022/0179570 | A1* | 6/2022 | Thakkar | G06F 3/0685 |
| 2022/0326878 | A1* | 10/2022 | Paduroiu | G06F 3/0659 |
| 2022/0327376 | A1* | 10/2022 | Xu | G06F 16/217 |
| 2022/0342578 | A1* | 10/2022 | Chen | G06F 3/0653 |
| 2023/0018773 | A1* | 1/2023 | Sudevalayam | G06F 3/0611 |
| 2023/0032590 | A1* | 2/2023 | Tran | G06F 3/0631 |
| 2023/0036528 | A1* | 2/2023 | Vankamamidi | G06F 3/067 |
| 2023/0177086 | A1* | 6/2023 | Mritunjai | H04L 67/1095 |
| | | | | 707/634 |

* cited by examiner

METHOD FOR OPTIMIZING THE MANAGEMENT OF A FLOW OF DATA

CROSS-REFERENCE TO RELATED APPLICATIONS AND PRIORITY

This patent application claims priority from European Patent Application No. 22382535.7 filed Jun. 2, 2022. This patent application is herein incorporated by reference in its entirety.

FIELD OF THE INVENTION

The present invention belongs to the field of computer-implemented methods, and, more specifically, to database management methods aimed to optimize the management of flows of time series data, like those coming from internet-of-things (IoT) infrastructures or sensors, stored in one or more databases, considering the whole life cycle of the data, as well as its age, improving the efficiency of data ingestion, storage, and retrieval.

BACKGROUND OF THE INVENTION

The rising interest in extracting value from data has led to a broad proliferation of systems aimed to gather this new oil. Sensors and monitoring infrastructures, traditionally used for supervising the status of a specific asset, became the starting point of bigger and more complex systems. These systems, able to refine data, have an incredible underlying potential. For example, thanks to these processes, factories are able to continuously gather data from their machines, for later applying, e.g., industrial predictive maintenance techniques, intended to predict and anticipate machine failures, increasing its up-time while reducing costs.

However, to perform further analyses from sensor readings, it is necessary to store the data they collect. Thus, databases (DBMS), whose main role is to organize data collections, became a crucial piece of these systems called data platforms. Traditionally, databases have been considered a passive asset: OnLine Transaction Processing systems (OLTP) ingested structured data that was stored according to a data model, being this model, in the vast majority of the cases, the relational model, which was considered, de facto, the standard model. Thus, "one-size-fits-all" was the extended generalist approach: each scenario was just modelled to fit in the relational model, typically tied to the SQL query language.

Nevertheless, the deployment of more complex and sophisticated scenarios exposed the constraints and weaknesses of traditional databases: they were not capable of enabling modern scenarios efficiently, showing that sometimes one size could not fit all, at least not efficiently. Thus, several new database technologies emerged, improving the handling of the data in a wide range of scenarios: The NoSQL (Not Only SQL) term was coined, showing a profound distancing from the deeply ingrained one-size-fits-all approach. In a few years databases moved from one-size-fits-all to one-size-for-each, where each scenario had a very specific and efficient data model, and each data model had a plethora of different databases to choose from. For example, Graph databases enabled the full potential of social networks, and key-value stores became crucial in huge online marketplaces.

Regarding monitoring infrastructures, in order to fulfil their particular requirements, such as real-time ingestion and historical querying, many specific-purpose Time-Series Databases (TSDB) emerged, each with its own data model, helping TSDBs become the fastest-growing database type since 2019.

Data models organize elements of data and define how they relate to each-other. Each data model has its own specific properties, performance, and may be preferred for different use cases. As data models vary, their properties and performance do too. Although the actual implementation might differ from one database to another, each data model follows some shared principles. Some of the most relevant data models, related to this time-series, are:

- Key-Value oriented. It is composed of independent and high granular records. These records are stored and retrieved by means of a key that globally identifies a record, linking it to a value, which is, typically, an uninterpreted string. Thanks to this independence, new records can be inserted speedily, even in parallel, reducing or preventing database locking procedures.
- Row oriented. A row, or tuple, represents a single data structure composed of multiple related data, such as sensor readings. Each row contains all the existing attributes that are closely related to the row primary key, the attribute that uniquely identifies the row. This makes it efficient to retrieve all attributes for a given primary key. All rows typically follow the same structure. Traditional relational solutions follow this design principle.
- Column oriented. Data is organized following a column fashion. Each column contains all the existing value related to the column identifier, for instance a sensorID. Column oriented data models are greatly efficient when performing historical queries. In addition, they enable cost effective compression mechanisms, such as Run-Length Encoding.

Most time-series databases follow the same, or very similar, way to ingest data. A time-series record is typically represented as a triplet, or a three-element structure, composed by: the ID of the sensor that reads the data, a timestamp of the instant in which it was read, and a value, representing the reading. However, some databases incorporate more elements, in order to integrate further metadata. This might be of great relevance depending on the case since the format in which time-series data is ingested can differ greatly from the way it is stored in disk.

MongoDB is the most popular NoSQL database. It is an open-source general-purpose solution that incorporates an extremely flexible document-based data model made out of JSON-like documents. As Time-series databases became increasingly relevant, MongoDB 5.0, released in mid-2021, introduced native time-series capabilities, being able to behave as a specific-purpose time series database on its own by following a bucketed column-like data model, embedded in its document-oriented data model. In order to query, users may use MongoDB's specific query language, named MongoQL. Regarding deployment and setup, MongoDB is able to scale horizontally at no cost, and to run natively in Windows, Linux, and MacOS, thus reaching a wide number of users.

NagareDB is a Time-series database built on top of MongoDB, which lowers its learning curve. Its data model, built on top of MongoDB's document-oriented data model, follows a column-oriented approximation, as data columns are embedded inside JSON-like documents. NagareDB inherits most of MongoDB's features, including its query language, its free and straight-forward horizontal scalability. It is a free, competitive alternative to popular and enterprise-licensed time-series databases, both in terms of querying and ingestion performance—however not always with a consistent or remarkable speed-up, sometimes falling behind.

InfluxDB is a specific-purpose Time-Series database, considered the most popular one since 2016. InfluxDB follows a column-oriented data model, able to efficiently reduce its disk usage.

In order to query, users can use InfluxQL, a SQL-like query language, or Flux, a more powerful alternative, able to overcome many of the limitations of InfluxQL. Regarding its deployment, its open-source version is limited to a single machine, only allowing monolithic setups, and relegating its scalable mechanisms to the enterprise edition. InfluxDB can be installed on Linux-based and MacOS systems, but not on Windows.

TimescaleDB is a Time-series database built on top of PostgreSQL, one of the most popular General-Purpose DBMS [6], which lowers its learning curve. However, due to the limitations of the underlying rigid row-oriented relational data model, its scalability, performance and disk usage might be compromised, depending on the use case and query. It is able to run on Windows, MacOS, and Linux, thus reaching a wide number of potential users.

It may be noticed that most of the mentioned databases are designed to use a column-oriented data model, either as its base data model, like InfluxDB, or by adapting its underlying data model, in order to simulate a column-oriented approximation. In consequence, performances are expected to be rather similar (proficient in some scenarios and penalizing in others), following the intrinsic limitations of column-oriented data models.

The NoSQL movement represented a great distancing from the one-size-fits-all approach, and its relational implementations. Particularly, it offered great progress towards more efficient databases, aiming the database engineers to select specific data models, choosing them according to type of data to be handled, and its properties.

Even so, this was found still not sufficient for some high demanding scenarios, which lead to the birth of Polyglot persistence, defined as using multiple data storage technologies chosen by the way data is used by individual applications. Thus, polyglot persistence intended to obtain the best from every technology, tailoring every application with the database that fitted the most. However, it had a major problem: There were a big number of different data models, and each data model was implemented by a plethora of different NoSQL solutions. Finding experts for keeping track and mastering all those rapidly evolving technologies became increasingly difficult.

In order to alleviate this problem, other NoSQL technologies emerged: The so-called multi-model databases. They were specifically designed following a schema-less principle: no schema was enforced, thus, holding enough elasticity to allow the database engineer to create its own data model. Moreover, by pushing their limits, it was found even possible to create several data models at the same time. Thus, one single technology could hold different data models, and each data model could serve to a different application, in the same way polyglot persistence was conceived to do. This alternative was able to provide similar results to using ad hoc database solutions, while reducing drastically the number of software solutions to be used and mastered.

Taking into to account all of the above, every database is implemented differently, and, therefore, each one inherently holds specific properties, benefiting or limiting certain query types, ingestion mechanisms or deployment scenarios, among others. Consequently, altogether with the fast-growing plethora of TSDBs, selecting and mastering the most appropriate solution, for every use case, became fairly laborious.

In order to mitigate this problem, in the present invention an all-round polyglot-based approach for TSDBs is proposed, aimed at providing outstanding global performance while adapting itself to the particularities of each use case. More precisely, this holistic approach attempts to tailor the database not only to time series data, but also (1) to the natural data-flow of real-time data (ingestion, storage, retrieval), (2) to the expected operations according to data aging, and (3) to the final format in which users want to retrieve the data. In this way, the database is not limited to a single data model, but it can employ several interrelated models able to act as a whole, in different steps of the data-flow path, thus pushing the concept of polyglot persistence.

SUMMARY OF THE INVENTION

In order to mitigate the shortcomings mentioned above, the present invention proposes an all-round polyglot-based approach for TSDBs, aimed at providing outstanding global performance while adapting itself to the particularities of each use case. More precisely, this holistic approach attempts to tailor the database not only to time series data, but also to the natural dataflow of real time data (ingestion, storage, retrieval), to the expected operations according to data aging, and to the final format in which users want to retrieve the data.

The method of the invention, called for clarity Cascading Polyglot Data Flow, binds the time-series data life cycle (ingestion, storage, and retrieval) to a data flow stream path, inspired in a step-waterfall river. This holistic process efficiently collects and organizes data in several specific manners, optimizing the operations that are expected to be performed over the time-series data during its life cycle: when data is new, when data is considered recent, and when data is considered historical, as data navigates thought the cascade according to its aging. For instance, it enables fast data ingestion, while at the same time provides an efficient way to store and retrieve historical data.

Data (for instance, sensor readings) is ingested via the data pool(s) of the first step and keeps eventually cascading from one data pool to another, until reaching the last one. Each data pool is designed to keep the data that it holds in a specific manner, thanks to the data falls that move (and alter) the data from one data pool to another. Those data falls group, sort, or reduce the data that is being cascaded. Thus, a given sensor reading can only be found in one single data pool at a time.

Sensor data typically arrives at the system in an independent fashion, or at least not too grouped. As data cascades from one data pool to another, it either remains in groups of same size, or is grouped in larger buckets. Thus, the last pool holds the data in the biggest groups or buckets.

Each data pool has a certain capacity of data (in time terms: Day, Week, Month, 2 months, etc). When the clock ticks certain moment, data is flushed to the next data pool, via de data fall that connects them. The next data pool appends this new data to its already-existing data, until reaching its capacity, when it also cascades its data to the next data pool, if it not the last one.

It is important that the number of different data grouping structures is minimized, as the less different structures there are, the easier is querying. Thus, data falls, expect the first one, typically sort the groups on disk, but do not internally modify groups frequently.

The different data fall operations are:
- Grouping: Alters the modelling of the data or sensor readings, from being more independent to less dependent. This is, grouping sensor readings in bigger buckets or columns. The data is appended, after being grouped, to the destination pool data, and removed from the original one. It also modifies or generated a synthetic sensor "Timestamp" intended to serve as a template, facilitating the recovery of the timestamp-sensor reading matching, thanks to join operations.
- Sorting: Alters the disk organization of the grouped data or sensor readings, in order to follow a specific order, but leaves the data structure as it was previously. The data is appended, after being sorted, to the destination pool data, and removed from the original one. The data groups can be sorted sensor-wise (same-sensor data is placed consecutively) or time-wise (same-time data groups are placed consecutively).
- Reducing: Alters the data granularity by either filtering or aggregating data, being the origin source of another cascade-flow.

With these characteristics, advantageously, a first embodiment of the invention consists of a computer-implemented method for managing a flow of data in at least one database, wherein the flow of data comprises at least a first data flow portion and a second data flow portion, and said at least one database is configured with at least a first and a second data models of data storage, the method consisting in the follow steps:
a) receiving, during a first period of time, a first data flow portion in a computer;
b) storing said first data flow portion in a first data pool of the at least one database according to the first data model;
c) after the first period of time, cascading the first data flow portion from the first data pool to a second data pool in the at least one database and assigning the first data flow portion to the second data model;
d) repeating steps a)-c) for at least a second data flow portion.

This method, as explained before, allows to tailor the database to time series data, to the natural dataflow of real time data, to the expected operations according to data aging, and to the final format in which users want to retrieve the data.

In another preferred embodiment of the invention, at least the first or the second data model comprises a key-valued model, a short-column model, or a long-column model. These are three well-known data models, each one aimed for specific data management capabilities.

In another preferred embodiment of the invention, the first data model comprises a key-valued model. This allows to optimize the ingestion of data and the retrieval of vey young data in the database, since in this model the pieces of data are very independent from one another.

In another preferred embodiment of the invention, the second data model comprises a long-column model. In general, it is advantageous to use a long-column model as the last data model, i.e., the one in which the pieces of data are less independent. This favors historical querying, which means that it optimizes the management and retrieval of historical data mostly.

In another preferred embodiment of the invention, the flow of data comprises at least a third data flow portion, and at least one database is configured with at least a third data model of data storage, and the method further comprises the steps of:
e) repeating steps a)-c) for at least a third data flow portion;
f) after a second period of time, cascading the data from the second data pool to a third data pool in the at least one database, and assigning the first data flow portion to the third data model. This way, as many data pools, data models, and transforming cascades can be implemented in the method of the invention, according to the requirements of the data of interest and allowing, therefore, for the optimization of their ingestion, management and retrieval. Furthermore, in another related preferred embodiment of the invention, the first period of time is smaller than the second period of time, favoring the natural flow and aging of the data.

Also, when having more than two data models, as in another preferred embodiment of the invention, it is advantageous that an intermediate data model comprises a short-column model. This facilitates and optimizes the management and retrieval of intermediate data, neither too young not too old.

In another preferred embodiment of the invention, the flow of data is provided by an IoT infrastructure, one or more sensors, since these infrastructures typically provide large time series data, whose life cycle and management are optimized within the present invention.

In another preferred embodiment of the invention, wherein the first or the second data pool is configured with at least two polyglot abstraction layers. Polyglot abstraction layers consist of several data representations from which the user can access the very same data, but in different ways. This polyglot approach provides two additional main benefits: hybrid queries, since the abstraction layers enable data-model coexistence, and, thus, users are able to retrieve data independently from which data models it is stored in and are able to choose from which abstraction layer to query from, minimizing the data model transformation costs and final format consciousness, meaning that the method of the invention prevents a data transformation overhead, becoming more efficient and more resource-saving, accommodating itself to the final data format needed by the user.

On the other hand, the application of abstraction layers leads to four main traits of the invention's approach:
- Non-materialized views: abstraction layers are not persisted on disk, meaning that data is only stored once, in the database's internal format, but shown to the user in different perspectives. Data is transformed on-the-fly, if necessary, following one of the three predefined data mappings: key-value, column, or row. These transformations are not always performed, as some abstraction layers can be generated without further processing or can be partially cached in memory.
- Hinted generation: each query involves certain data, such as a specific time range, and/or several data origins or sensors. Abstraction layers receive this query metadata, which is, in fact, a part of the query itself, known as where clause in traditional databases. Thanks to this hint, the abstractions layers evaluate which data should be selected and transformed, fitting the abstraction layers as much as possible with respect to the requested data. By contrast, MongoDB, when querying time series, typically request the whole collection to be transformed, making it necessary to reshape data that might not be ever used, and to keep it in RAM, replacing its cache or consuming further RAM resources.

On-demand. Due to its hinted generation trait, and since every query involves different hints, there is no specific view ready to be queried. Instead, it is dynamically generated and returned to the user on-the-fly, when the user executes a particular query over the generic and visible abstraction layer. If the user navigates through the database, without performing any specific query, this very same generic abstraction layer, or view, will be shown, so that user's database perspective is kept consistent.

Pipelined Mapping. The data mapping from the original data model to the final data model, offered by the abstraction layers, is performed in multiple stages or in several, consecutive, intermediate mappings. Each stage is intended to transform, simultaneously, all data, considering that the output of one stage will be the input of the following one. Those stages are performed in RAM, using the underlying MongoDB's Aggregation Framework. This framework is typically intended to perform operation such as aggregations (MIN, AVG, etc.), but it is also able to alter the shape of data, or its structure, even being able to convert data from one data model to another, by using its powerful tools, such as aggregation pipelines or operations following the map-reduce paradigm, taking advantage of parallelism.

In another preferred embodiment of the invention, comprising at least a first and a second database, wherein the first data pool is stored in the first database, and the second data pool is stored in the second database. Thus, the method of the present invention can be implemented either in a multi-model database or in several data bases containing each at least on data model, making the implementation of the method more versatile.

Finally, other preferred embodiments of the invention comprise:
- a computer comprising hardware and software means adapted to perform a method according to any of the preceding claims;
- an IoT system comprising a computer as the one above, communicatively connected to a plurality of IoT devices adapted with means to generate at least a flow of data and to send said flow of data to the computer;
- a computer program adapted to perform a method according to any of the embodiments of the present invention; and
- a computer-readable storage medium/data carrier comprising a computer program according to the preceding claim.

In summary, the proposed method is capable of outperforming popular and mainstream approaches, and to illustrate that it is possible to improve and adapt already-existent databases, in order to cope with demanding specific-purpose scenarios, relieving the need of developing further database management systems (DBMS) from scratch.

BRIEF DESCRIPTION OF DRAWINGS

FIG. 4 shows a representation of a Simplified data access of the method's second data model, when requesting all existent readings for day 2 (left), and all historical readings for Sensor 4 (right). Arrows represent the operations needed to perform in the database in order to access the desire data.

FIG. 5 shows a representation of a Simplified data access of the method's third data model, when requesting all existent readings for day 2 (left), and all historical readings for Sensor 4 (right). Arrows represent the operations needed to perform in the database in order to access the desire data.

FIG. 10 shows the comparison of the aggregation querying response times for different data models of the method of the invention as well as for NagareDB and InfluxDB.

DETAILED DESCRIPTION OF THE INVENTION

A preferred embodiment of the invention, shown in FIGS. 1-13, will be now described for illustrative, but not limiting, purposes.

Figure 1A:
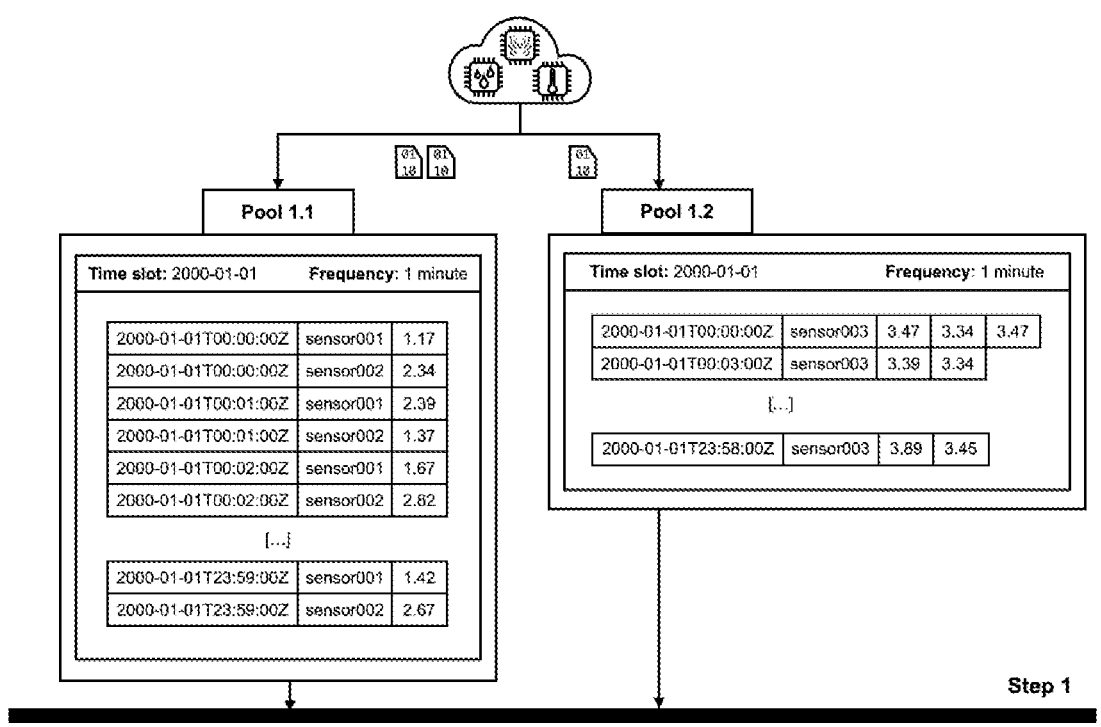
FIG. 1A shows a schematic representation of the first stage of method of the invention, according to a preferred embodiment thereof. In this case, the method comprises the use of two first data pools (1.1 and 1.2) in which data is organized according to two first data models, and in which a cascade takes places towards the second stage of the method.
Figure 1B:
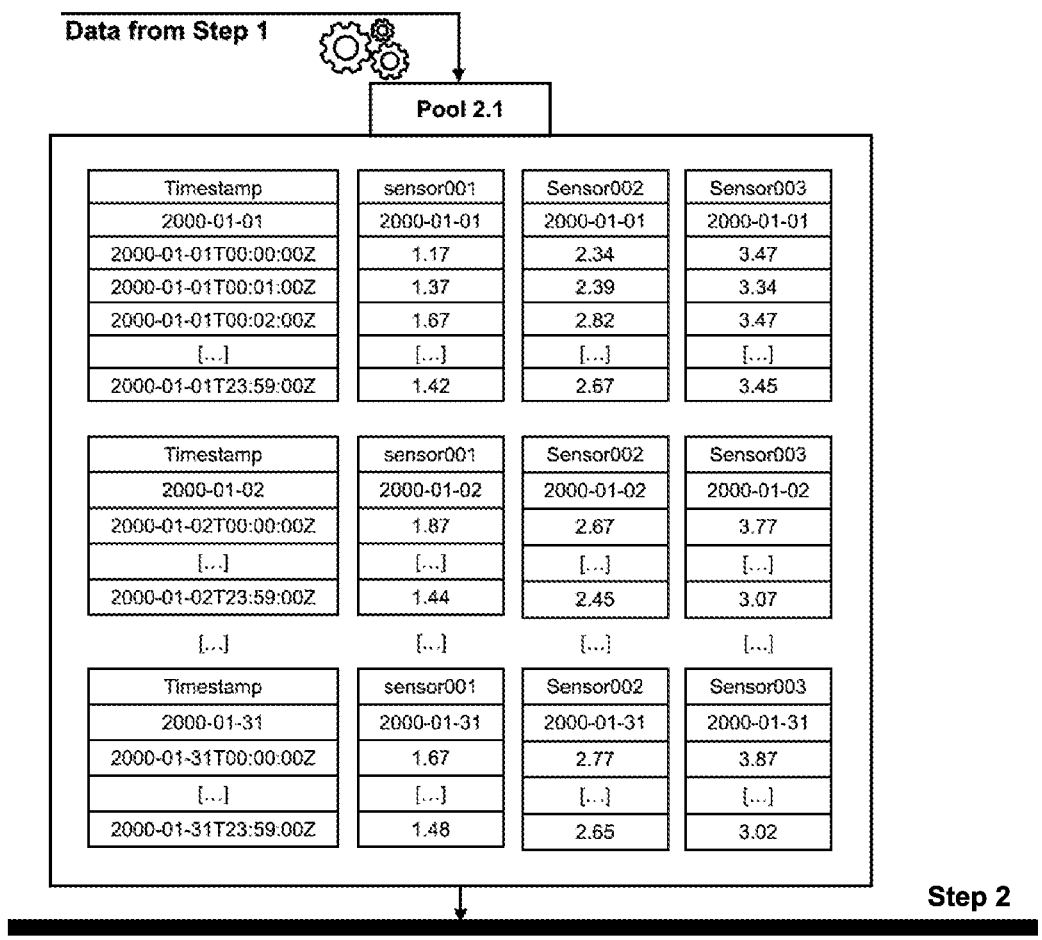
FIG. 1B shows a schematic representation of the second stage of method of the invention, according to a preferred embodiment thereof. In this case, the method comprises the use of a second data pool (2.1) in which data is organized according to a second data model, and in which a cascade takes places towards the third stage of the method.
Figure 1C:
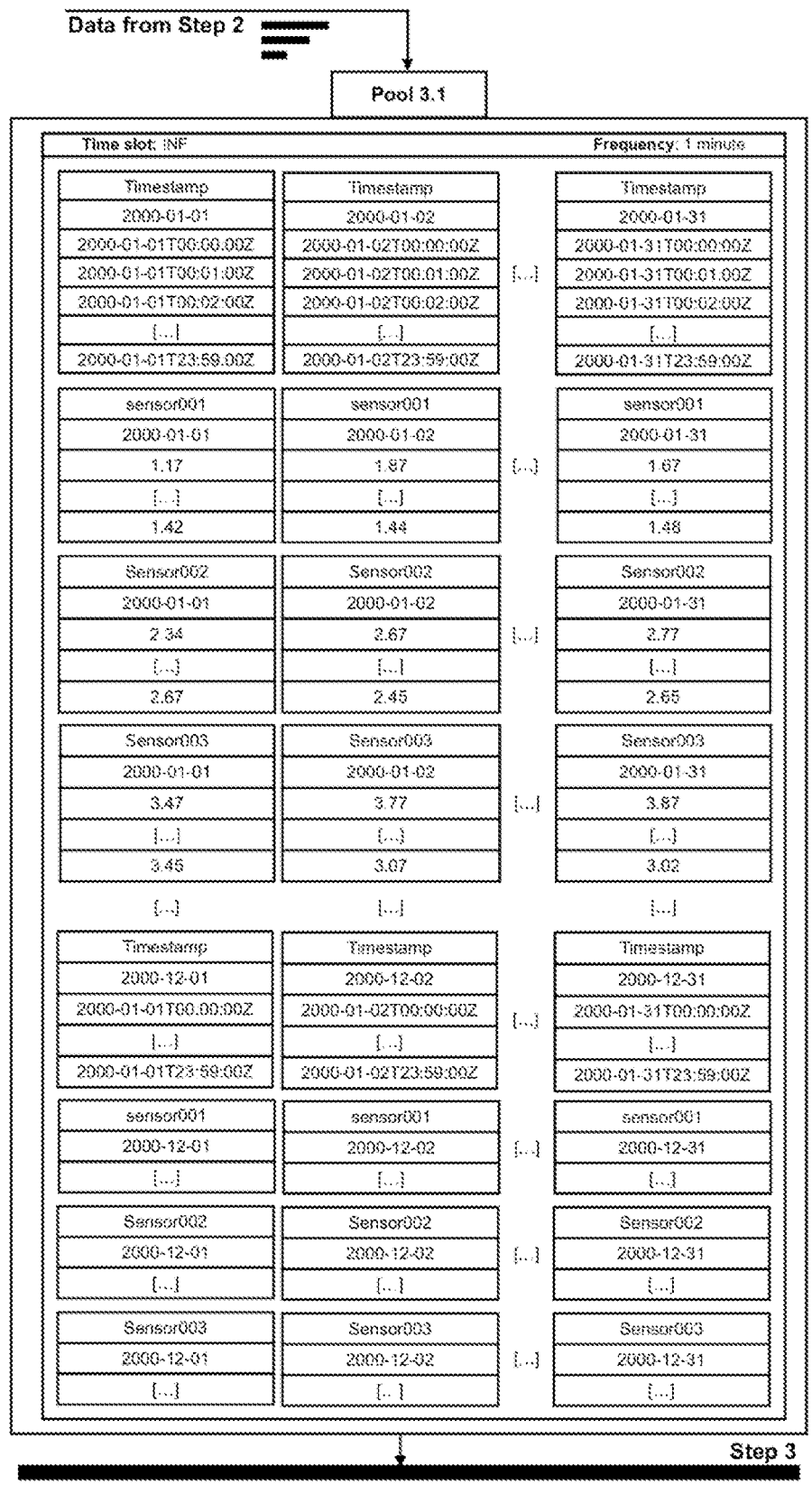

FIG. 1A-FIG. 10 shows a schematic representation of a particular embodiment of the method of the invention, which, in this case, comprises the use of four data pools in which data is organized according to three different data models: two in the first, data reception, stage (FIG. 1A), one in the second stage (FIG. 1B) and one in the third stage (FIG. 1 C). Moreover, two cascading processes, in which data is transformed, take place: one from the first stage to the second, i.e., from the two first data pools to the second data pool, and one from the second stage to the third, i.e., from the second data pool to the third data pool. Data (for instance, sensor readings) is ingested via the data pools of the first step and keeps eventually cascading from one data pool to another, until reaching the fourth one. Each data pool is designed to keep the data that it holds in a specific manner, thanks to the data falls that move (and alter) the data from one data pool to another. This data falls occur in time intervals of one day (from the first to the second) and of one month (from the second to the third), optimizing the operations that are expected to be performed over the time-series data during its life cycle.

Although FIG. 1A-FIG. 10 show data in a static manner, in the real system a given sensor reading or piece of initial data can only be found in one data pool at a time. However, FIG. 1A-FIG. 10 show the same data in the three example data steps in order to facilitate the interpretation of how data is transformed or sorted.

In said Figures, the process starts with the initial data coming from data sources: sensors, meters, etc. This data fall, initially, into two data pools that store their data in a data-model or structure intended to maximize ingestion capabilities. The first one, Pool 1.1, employs an ad-hoc key-value data model to store readings from Sensor001 and Sensor002. The second one, Pool 1.2, employs an ad-hoc small-column data model to store reading from Sensor003. Both pools store up to one day of data, meaning that when a new day begins, the previous day data is shipped to the next data pool, via a cascade. The frequency of the data is set to minutes, meaning that there is a value expected for each minute and each sensor. This data step contains the data polls that hold the data with higher independence (less grouped), as they are the entrance of the system. It must be noticed that, in this Figure, the headers (in grey), identify a sensor reading, or a group of sensor readings.

After one day, a grouping data fall or cascade takes place: it fits the sensor readings into a bigger data structure, grouping more independent sensor readings into groups or columns. It also generates or modifies the timestamp column, that stores the timestamps of the sensors, for its later matching, via de headers. For instance, it will compact all sensor readings from the same sensor and same day into a single data structure: a short column, in this case.

The transformed data is then stores in Pool 2.1 (Intermediate Data Pool), which receives short columns (groups of data from a given sensor and a given day), and store them as they arrive, each day, appending them to the already existing data. Data is stored, on disk, time-wise. For instance: Each sensor daily data will be placed consecutive to other sensors daily data. Once all sensors' readings, for a given day, are stored, the data regarding the next day will follow. Thus, in disk, the sequential order of data will be: Timestamp-day1-data, Sensor1-day1-data, Sensor2-day1-data, Sensor3-day1-data, Timestamp-day2-data, Sensor1-day2-data, etc. Its time slot is 1 month. Daily data groups are identified by the sensorID and the day timestamp. This foreign key helps joining the sensor data with its respective timestamps, stored in a synthetic column called timestamp, just as if it was another sensor. In Pool 2.1 the horizontal "row" of groups represents one day of data, the total amount of data coming from the last data fall. As the time slot of this pool is one month, once the month passes, the data will be sent to the next pool in the cascade flow, through a data fall. Although in the example this pool connects with the last one (pool 3.1), there can be as many intermediate pools as desired, taking into account that each data fall will create bigger groups. For example, this monthly data could go directly to a yearly data pool (as it does in this example) or to a bi-monthly data pool, or similar.

After a month has passed, a sorting data fall or cascade takes place. It alters the disk organization of the buckets in order to follow a specific order that maximizes read performance. For instance, short-columns become in-disk long columns, as same-sensor buckets, or short-columns, are stored adjacently. Thus, although buckets keep being independent from a logical perspective, they are no longer independent in terms of physical persistence. It does not alter the data structure of the groups.

In this step, the transformed data is store in Pool 3.1. It receives the data grouped in the shape of daily columns, as the previous cascade is just sorting them, not altering its data structure. Sensor daily-columns or groups are sorted sensor-wise, as the example data fall is set to, meaning that all data from a given sensor, from the previous data pool flush, is stored adjacently in disk, forming an in-disk larger column. It is the stream data pool, as it is the last data pool. On this example, it will keep all historical data, except if manually removed. The horizontal "row" of short columns (or long column) represents, in this case, one month of data for a given sensor. As there are 4 sensors (3 sensors+1 synthetic timestamp), each for "row of groups" represents the total amount of data coming from the last data fall. Data will remain in this pool until manually removed.

Figure 2:
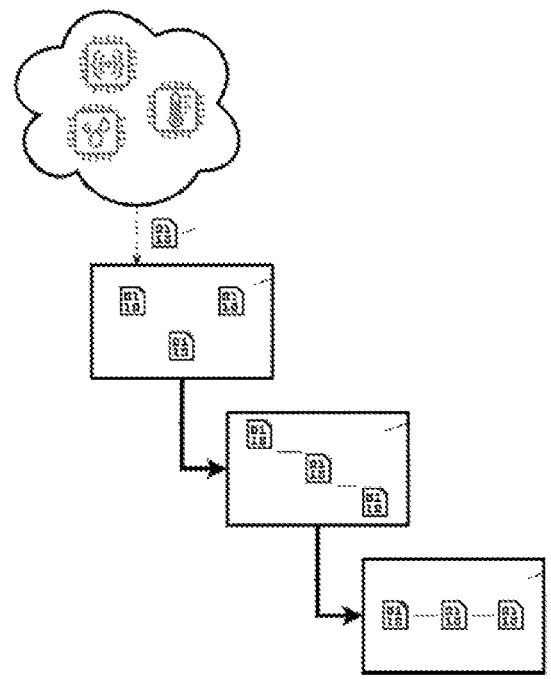
FIG. 2 shows a simplified version of FIG. 1 for clarity and simplicity purposes.

FIG. 2 shows a simplified, continuous, and compact version of the combination of FIG. 1A-FIG. 10, so that the whole method is presented in the same figure for clarity and illustrating purposes.

The method of the invention is materialized in an alternative implementation of NagareDB, referred as PLNagareDB. Three holistic approaches, divided in three different categories with respect to their scope, are implemented. Concretely:
  Cascading Polyglot Persistence intends to create an efficient way of ingesting and storing data, for its later retrieval,
  Polyglot Abstraction Layers aims to offer an efficient and easy way in which users can query the database, hiding its internal complexity, and, lastly,
  Miscellaneous explains some ad hoc modifications of the original NagareDB, in order to better fit the alternative PL-NagareDB.

Cascading Polyglot Persistence

Figure 3:
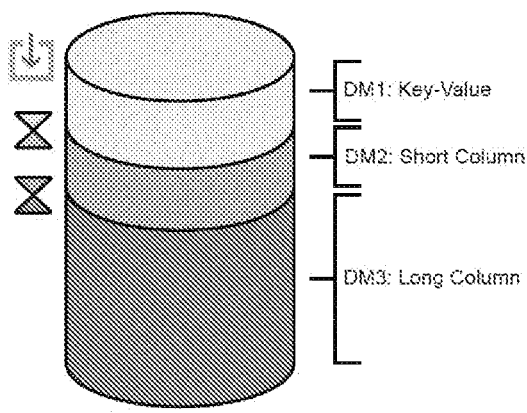
FIG. 3 shows a representation of the method's polyglot persistence cascade, with the three different and consecutive data models.
Figure 6:
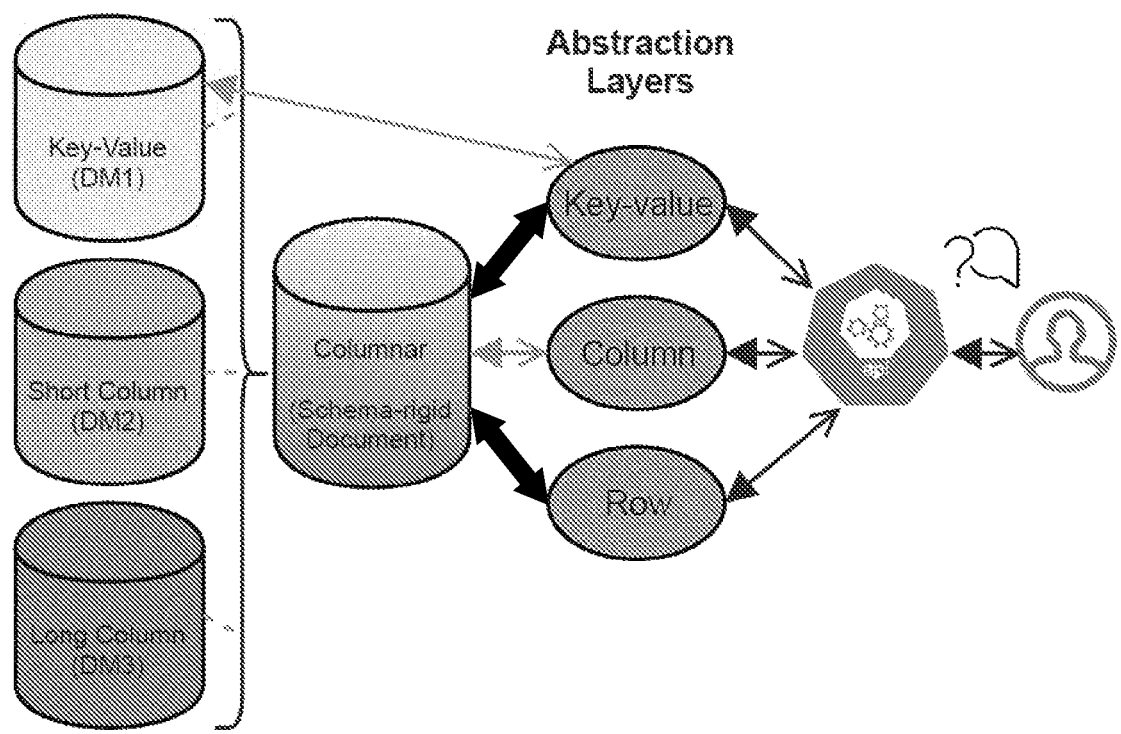
FIG. 6 shows a schematic representation of the method's Abstraction Layers, in three different data model orientations. The left-hand side arrows in light grey represent direct or cost-less data flows, while the left-hand side arrows in darker grey represent data flows in which transformations are required.

Here, Cascading Polyglot Persistence is materialized on top of a multi-model database, intended to keep all data models. This not only reduces software requirements, but also the overhead of cascading data from one data model to another. PL-NagareDB implements three different data models (DM 1 to 3), keeping sensor readings just in one single data model at the same time, cascading from one data model to another along time. These three data models are fitted to the inevitable data generation order, according to time. Moreover, this hybrid approximation is intended to benefit ingestion and query speed, while ensuring that no extra disk space is needed. Concretely, sensor readings will be ingested in DM1, for later being temporarily stored in DM2, and finally, being consolidated in DM3, as shown in FIG. 3.

More precisely, the different data models are defined as follows:
  DM1: Key-Value. It is modelled following a key-value approximation, where each sensor reading is completely independent from others. This non-bucketing strategy is mainly intended to improve the throughput in data ingestion processes. Moreover, thanks to the fact that data is not organized in buckets, queries that do not involve historical data will be highly benefited. For example, real-time control panels typically check the current status of all sensors in a certain point in time, or even continuously. This data model is specifically intended to benefit those timestamped queries as, first, it benefits non-historical queries and, second, it only keeps most recent data, which is the typical target of monitoring control panels. Its default data capacity is one day, meaning that sensor readings will be flushed from DM1 to DM2 once per day.

Figures 4, 5:
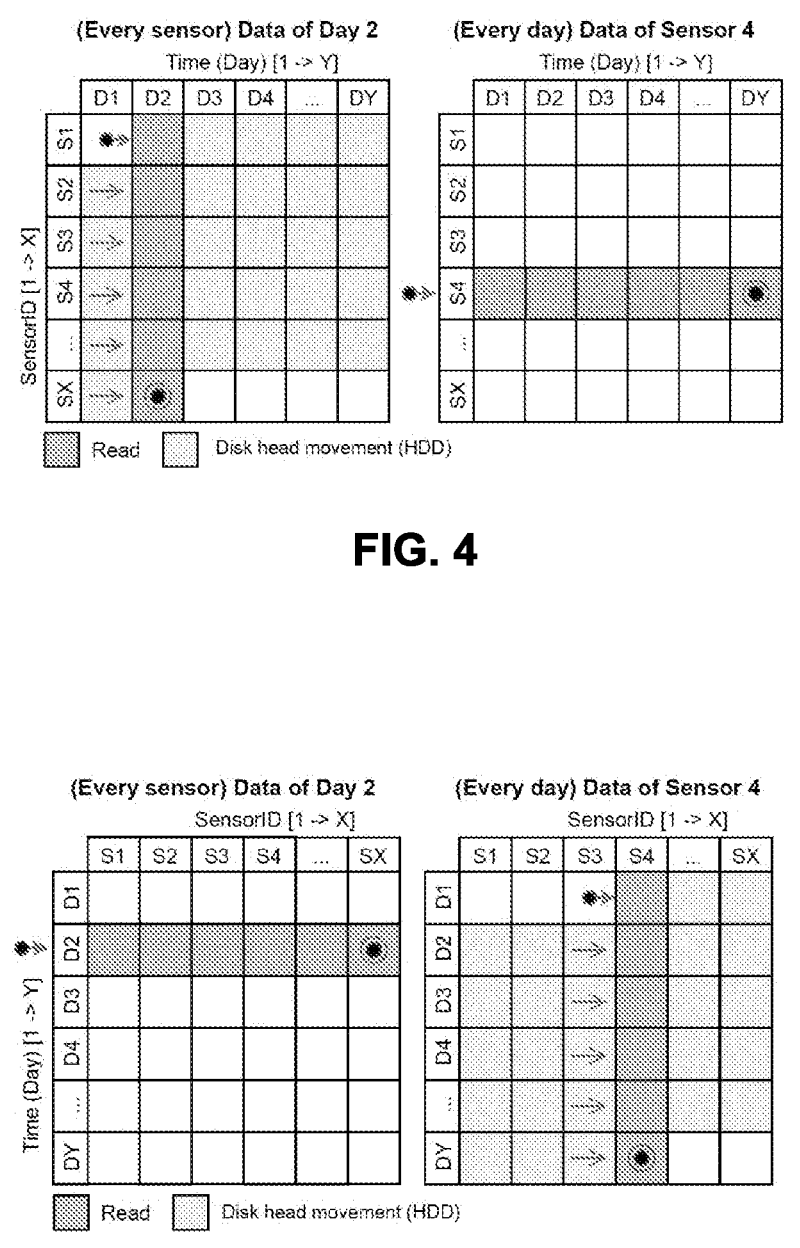

DM2: Short-Column. It acts as a data bridge between DM1 and DM3. Data is bucketed in daily short columns, per each sensor, meaning that all readings for a given sensor and a given day will be packed together in a columnar shape. Thus, JSON-like documents, the basic data structure of the underlying database, are intended to store data in a columnar shape, following a schema-fixed approach. The specific data embedding mechanisms that DM2 follows are extensively detailed in NagareDB's presentation research study as, actually, the original data model of NagareDB is equivalent to this research's DM2. In disk, it is organized following the natural timeline, according to data arrival order from DM1: all sensor's data from a given day will be placed adjacently. This makes it organized in a time-natural way: first by day, and, later, by sensor. FIG. 4 represents the in-disk representation of DM2 in which all sensor readings of a given day are consecutively organized in disk, left to right. Thus, when solving the sample query "return every sensor data in day 2", the disk will be able to go to the first element of day 2 (Sensor 1 data), and sequentially read all data of other sensors, for that very same day, making it efficient. Conversely, if requesting all historical data for Sensor 4, as seen in FIG. 4, it will have to jump from one day to another, performing several random reads, which is far less efficient. This bridge data model is intended to optimize daily and hybrid queries, at the same time that its usage is mandatory, as it is not possible to directly store all sensor historical data consecutively in disk, because it contradicts the natural order of time, without the usage of padding or further resource-consuming techniques. Its default data capacity is one month, meaning that sensor readings will be flushed from DM2 to DM3 each month.

DM3: Long-Column. It is modelled following a columnar approximation, where all historical data of a given sensor, in a specific month, is stored consecutively. This is intended to improve historical queries—the ones expected in historical and not-so-recent data—as it is able to benefit from sequential readings. In fact, the logical data representation is the same as in DM2, the original short-column data model of NagareDB. The main difference is that these short-columns are stored consecutively in disk, by sensor, forming a long-column. FIG. 5 represents the in-disk representation of DM3: All sensor readings of a given sensor are consecutively organized in disk, left to right. Thus, for solving the sample query return every sensor data of day 2 it will jump from one sensor to another, performing several random reads. Conversely, if requesting all historical data for Sensor 4, as seen in FIG. 5, the disk will be able to go to the first element of Sensor 4 (Day 1), and sequentially read all data of other days, for that very same sensor. This data model keeps all the historical data that is not present in DM1 or DM2.

MongoDB—PL-NagareDB's foundation database—has usually paid little attention to document disk order, as it brings low-level extra difficulties for the database architects. However, this disk-conscious approach is able to bring further optimizations. Concretely, creating an in-disk long column (DM3) from short columns (DM2) has two main benefits: first, it does not involve the creation of a new data structure. Thus, from a user's code perspective there is no difference between querying DM2 or DM3. Second, the cascade from DM2 to DM3 is expected to be efficient, as there is no real overhead in changing from one logical data model to another, with the physical disk organization being the only difference. When cascading data to the following data model, it is not necessary to perform any where or match query, as data is already separated in collections, in a daily or monthly basis. Thus, the operation intended to move data from one data model to another only needs to perform a collection scan in a bulk-operation fashion, making it cost-efficient. Moreover, this operation can be completely performed in-database, thanks to the out and merge function enhancement introduced in MongoDB 4.4. This allows to perform both the operation and the disk persistence in one single query, within the database.

Finally, as data is organized in different collections, according to time, when flushing data from one data model to another, a different collection will be used for storing the real-time data received. This prevents the database from waiting due to blocking or locking mechanisms.

Polyglot Abstraction Layers

While Cascading, Polyglot Persistence is expected to improve the databases' performance, but it also increases the system complexity, which can negatively affect user interaction. In order to reduce this drawback, while providing further optimizations, Cascading Polyglot Persistence is coupled with Polyglot Abstraction Layers. An Abstraction layer typically allows users to comfortably work with their data, without having to worry about the actual in-disk data model or persistence mechanisms. However, PLNagareDB goes one step beyond by implementing Polyglot Abstraction Layers, so, several data representations from which the user can access the very same data, but in different ways. This polyglot approach provides two additional main benefits:

Hybrid Queries: the Abstraction Layers enable data-model Coexistence. Thus, users are able to retrieve data independently from which data models it is stored in. This enables users to comfortably query, at the same time, data that is stored in 1, 2, 3 or more different data models. Moreover, thanks to the Polyglot approach, and to the intermediate API, users are able to choose from which abstraction layer to query from, minimizing the data model transformation costs. This can be more easily seen by checking the different arrows on the left-hand side of FIG. 6.

Final Format Consciousness: regardless of the internal data representation, databases typically return data in one specific and pre-defined format. For example, MongoDB transforms its internal data representation to a key-value approximation for its use, and InfluxDB returns data in a row-oriented fashion. While this might be suitable in some occasions, it can heavily compromise the system performance, due to excessive and unnecessary data transformation overheads. For instance, if the user is expecting to retrieve data in commonly-used Python Pandas dataframes, which are efficiently generated from columnar data, MongoDB and InfluxDB outputs are heavily penalized: both databases would shape their data into columns, transform it into key-values and rows, respectively, for later re-creating the columnar data (which was the original data model approximation), in order to fit the end dataframe format. PLNagareDB's adaptability or Final Format Consciousness prevents this data transformation overhead, becoming more efficient and more resource-saving, accommodating itself to the final data format needed by the user. If the user requests data in tables or dataframes, PL-NagareDB will query the columnar abstraction layer. If the user requests a dictionary, PL-NagareDB will internally use the key-value abstraction layer, and so on. All three abstraction layers are internally implemented as a database view, so, a new data collection made out of the result set of a stored query or procedure. Users can query it just as they would in a real data collection. Thus, users are able to query any abstraction layer straightforwardly, not even noticing that it is, in fact, a view, and not a data collection.

The application of Abstraction Layers leads to four main traits of the invention's approach:

Non-materialized views: abstraction layers are not persisted on disk, meaning that data is only stored once, in the database's internal format, but shown to the user in different perspectives. Data is transformed on-the-fly, if necessary, following one of the three predefined data mappings: key-value, column, or row. These transformations are not always performed, as some abstraction layers can be generated without further processing or can be partially cached in memory.

Hinted generation: each query involves certain data, such as a specific time range, and/or several data origins or sensors. Abstraction layers receive this query metadata, which is, in fact, a part of the query itself, known as where clause in traditional databases. Thanks to this hint, the abstractions layers evaluate which data should be selected and transformed, fitting the abstraction layers as much as possible with respect to the requested data. By contrast, MongoDB, when querying time series, typically request the whole collection to be transformed, making it necessary to reshape data that might not be ever used, and to keep it in RAM, replacing its cache or consuming further RAM resources.

On-demand. Due to its hinted generation trait, and since every query involves different hints, there is no specific view ready to be queried. Instead, it is dynamically generated and returned to the user on-the-fly, when the user executes a particular query over the generic and visible abstraction layer. If the user navigates through the database, without performing any specific query, this very same generic abstraction layer, or view, will be shown, so that user's database perspective is kept consistent.

Pipelined Mapping. The data mapping from the original data model to the final data model, offered by the abstraction layers, is performed in multiple stages or in several, consecutive, intermediate mappings. Each stage is intended to transform, simultaneously, all data, considering that the output of one stage will be the input of the following one. Those stages are performed in RAM, using the underlying MongoDB's Aggregation Framework. This framework is typically intended to perform operation such as aggregations (MIN, AVG, etc.), but it is also able to alter the shape of data, or its structure, even being able to convert data from one data model to another, by using its powerful tools, such as aggregation pipelines or operations following the map-reduce paradigm, taking advantage of parallelism.

Miscellaneous

As the method of the invention is aimed at increasing system performance without increased cost, some further modifications are done to PL-NagareDB in order to maximize the trade-off between efficiency and resource consumption:

Query parallelization: NagareDB's configuration was modified so that query parallelization is only performed in aggregation queries. Any other CPU-consuming query, such as the ones that involve comparisons, were set to be executed serially.

Timestamps: NagareDB's behaviour is to never generate timestamps, but to join data with already existing, and persisted, ones. Here this behaviour is modified so that it only happens with historical queries, where the number of timestamps is equivalent to the number of sensor readings per sensor. Said in another way, in those queries where the number of timestamps is smaller than the number of values to display, the timestamps will be generated dynamically. This affects, for example, downsampling queries: If the baseline granularity was set to minutes, and the target one to hours, there would be 60 sensor readings per hour, but only one timestamp. In this situation, the timestamp is generated dynamically.

The efficiency of the method of the invention has been evaluated with respect to other methods present in the state of the art. The experimental setup is intended to evaluate the performance of the polyglot approaches implemented in PLNagareDB, comparing it against several commonly used Time-Series databases.

The experiment is conducted in a Virtual Machine (VM) that emulates a commodity PC configured with:
 OS Ubuntu 18.04.5 LTS (Bionic Beaver),
 4 threads @ 2.2 Ghz (Intel® Xeon®),
 20-8 GB RAM DDR4 2666 MHz (Samsung),
 Fixed size Storage (Samsung 860 SSD),
 And with comparative software:
 MongoDB 5.0 CE: It is the most popular NoSQL database. It includes, by default, a Time series implementation.
 InfluxDB OSS 2.0: The most popular TSDB.
 NagareDB: A Time-Series database, built on top of MongoDB 4.4 CE.
 PL-NagareDB: An alternative multi-model implementation of NagareDB that includes the polyglot approaches explained in section IV.

Regarding the data set, its goal is to provide a synthetic scenario that does not use real data, but whose sensor readings are close enough to real-world problems. Thus, a Monitoring Infrastructure based on real-world settings of some real organizations is simulated. More precisely, the simulation represents a Monitoring Infrastructure composed of 500 sensors, equally distributed in five different categories. Each virtual sensor is set to ship a reading every minute. Sensor readings (R) follow the trend of a Normal Distribution with mean $\mu$ and standard deviation $\sigma$: $R \sim N(\mu, \sigma^2)$: $\mu \sim U(200, 400)$, $\sigma \sim U(50, 70)$ where each sensor's $\mu$ and a are uniformly distributed.

The simulation is run in order to obtain a 10-year historical data set. The start date is set to be year 2000, and the simulation is stopped when reaching year 2009, included. In consequence, the total amount of triplets, composed of Timestamp, SensorID, and Sensor Reading, is 2.630.160.000. Further configurations, such as ones including a larger amount of sensing devices, are likely to provide similar or proportional results, depending on the query type. This is due to the fact that seek times, in solid-state drive (SSD) devices, are typically a constant latency. This effect does not occur on traditional Hard Disk Drive (HDD) devices, which makes them to be broadly discouraged for intensive workload database scenarios, such as the ones involving monitoring infrastructures. Taking this into account, some database providers, such as MongoDB or InfluxDB, do not recommend using HDD devices, to the extent that InfluxData, the developers InfluxDB, the most popular Time-Series database, have not tested their solution on HDD devices.

The evaluation and benchmarking is done in four different aspects: Data Retrieval Speed, Storage Usage, Data Ingestion Speed, and Data Cascading Speed, and it is based on NagareDB's original one, making it easier to perform a detailed and precise analysis against NagareDB's original implementation. Thanks to this complete evaluation, it is possible to analyze the performance of the different data models during the data flow path, with regard to the database scope: from being ingested, to being stored and, lately, retrieved.

With respect to the data itself, DM1 is set to only hold one day, its default configuration. DM2 is, by default, only expected to hold one month of data. However, since it is the baseline data model of NagareDB, it will also participate in yearly queries, in order to obtain further insights and behaviour differences. Last, NagareDB is able to use limited precision data types, allowing up to 40% of disk usage while providing further speedup. However, as this behaviour does not affect the effectiveness of the polyglot mechanisms, this benchmark only includes full-precision data types, in order to avoid repetitive or trivial results.

Regarding data retrieval speed, it benchmarks the efficiency and query compatibility of PL-NagareDB's data models, evaluating them against other TSDB solutions, in terms of query answer time. First, the method is evaluated against MongoDB, considered as a Baseline solution, and, later it is evaluated against more advanced solutions for Time-Series data management, such as InfluxDB, and NagareDB's original implementation. This benchmark partitioning intends to provide clearer plots, as execution-time result sets belong to different magnitude orders, depending on the database, which substantially detracts value from the visualizations when plotting them together. Moreover, in order to obtain an exhaustive benchmark, while keeping its simplicity, data models are tested separately. However, they can be queried simultaneously, in a hybrid manner, providing a gradient of times, proportional to the amount of data belonging to one or another data model. The testing query set is composed by 12 queries (see Table 1), intended to cover a wide range of use-cases, while providing insights of the databases' performance and behaviour. They lay in four different categories:

historical querying: these queries obtain sensor readings for a specific range of time. They are answered with a dataframe, which follows a tabular fashion (Q1 to Q7);

timestamped querying: these queries are intended to obtain sensor readings for a specific timestamp. They are answered with a dictionary of key-value pairs, like, for instance, sensorID-sensorReading (Q8);

aggregation querying: these queries derive group information by analyzing a set of data entries. It is divided in two sub-categories:

AVG downsampling: they reduce the granularity of the data by performing averages of individual readings. Answered with a dataframe. (Q9 and Q10);

Single Value Aggregation: intended to obtain a single value from a set of readings, such as the minimum value. Answered with a triplet. (Q11);

inverted querying: these type of queries request moments in time that match certain value condition, such as sensor reading being smaller than a given number. Answered with a dataframe. (Q12).

TABLE 1

Data retrieval queries, used in the benchmarking

| ID | Query Type | # Sensors | Sensor Condition | Period | Value Condition | Target Granularity |
|---|---|---|---|---|---|---|
| Q1 | Historical | 1 | Random | Day | — | Minute |
| Q2 | Historical | 1 | Random | Month | — | Minute |
| Q3 | Historical | 1 | Random | Year | — | Minute |
| Q4 | Historical | 10 | Consecutive | Day | — | Minute |
| Q5 | Historical | 10 | Consecutive | Month | — | Minute |
| Q6 | Historical | 10 | Consecutive | Year | — | Minute |
| Q7 | Historical | 10 | ID mod 50 = 0 | Year | — | Minute |
| Q8 | Timestamped | 500 | All | Minute | — | Minute |
| Q9 | Downsampling (AVG) | 1 | Random | Year | — | Hour |
| Q10 | Downsampling (AVG) | 20 | Consecutive | Year | — | Hour |
| Q11 | Aggregation (MIN) | 1 | Random | Day | — | Minute |
| Q12 | Inverted | 1 | Random | Year | $V \leq \mu - 2\sigma \parallel V \geq \mu + 2\sigma$ | Minute |

While the nature of the different query types is singularly diverse, their implementation is straight-forward. In fact, in SQL terms, all querying types could consist only in three different clauses: SELECT, FROM and WHERE, except from the aggregation querying ones, that could also incorporate a GROUP BY clause. Each query is executed 10 times over the data-set described above, one per each year (2000 to 2009). All execution times and outputs are recorded, and, for each query, the average execution time, its 95% confidence interval, and its mean value are calculated. The querying is always performed using Python Drivers, for any of the solutions to be evaluated. In order to ensure the cleanness and fairness of the results, the databases are rebooted after the complete evaluation of each query. All queries are evaluated against every PLNagareDB's data model, except from Data Model 1, that only executes queries involving time ranges equal or smaller than one day, as it is its default maximum size.

In order to perform the first-baseline-benchmark, the method and all its data models, materialized as PLNagareDB, against MongoDB's Time-Series capability, are evaluated. Table 2 contains the execution times for all PLNagareDB's data models, as well as for MongoDB's solution. PL-NagareDB's execution times are displayed calculating their average execution time, plus its 95% confidence interval. MongoDB's execution times are displayed in two fashions: its average execution time, plus its 95% confidence interval, and its median execution time (last column). This complementary metric, specific to MongoDB, is proposed due to its substantially large confidence interval, which makes execution times more unstable in MongoDB than in the proposed method. This effect is due to the fact that MongoDB implements an abstraction layer based on a fixed non-materialized view for accessing its data: when users perform a query, MongoDB aims to transform all data to its exposed data model, with disregard to the specific data requested. This prefetch technique intends to anticipate to future queries but makes it really dependent from Random Access Memory (RAM), as transformed data, that might never be used, is kept there, consuming further resources. Moreover, once a different data set is queried, if RAM is not free enough, it might be partially or totally replaced, making it necessary to load everything back from disk.

than in MongoDB, which might be surprising, as historical queries are a worst-case scenario for key-value data models, such as the one of DM1, as its data holds the highest granularity.

In order to perform an advanced benchmark, the method of the invention and all its data models (for instance: DM1, DM2 and DM3), materialized as PL-NagareDB, are evaluated against InfluxDB, intending to evaluate their performance in comparison to a top tier time-series database, and against NagareDB's original implementation, in order to check whether the present approach improves the performance of the database. The benchmark, in terms of querying, is divided in four different sections, one per each query category, for instance: Historical Querying, Timestamped Querying, Aggregation Querying, and Inverted Querying.

Figure 8:
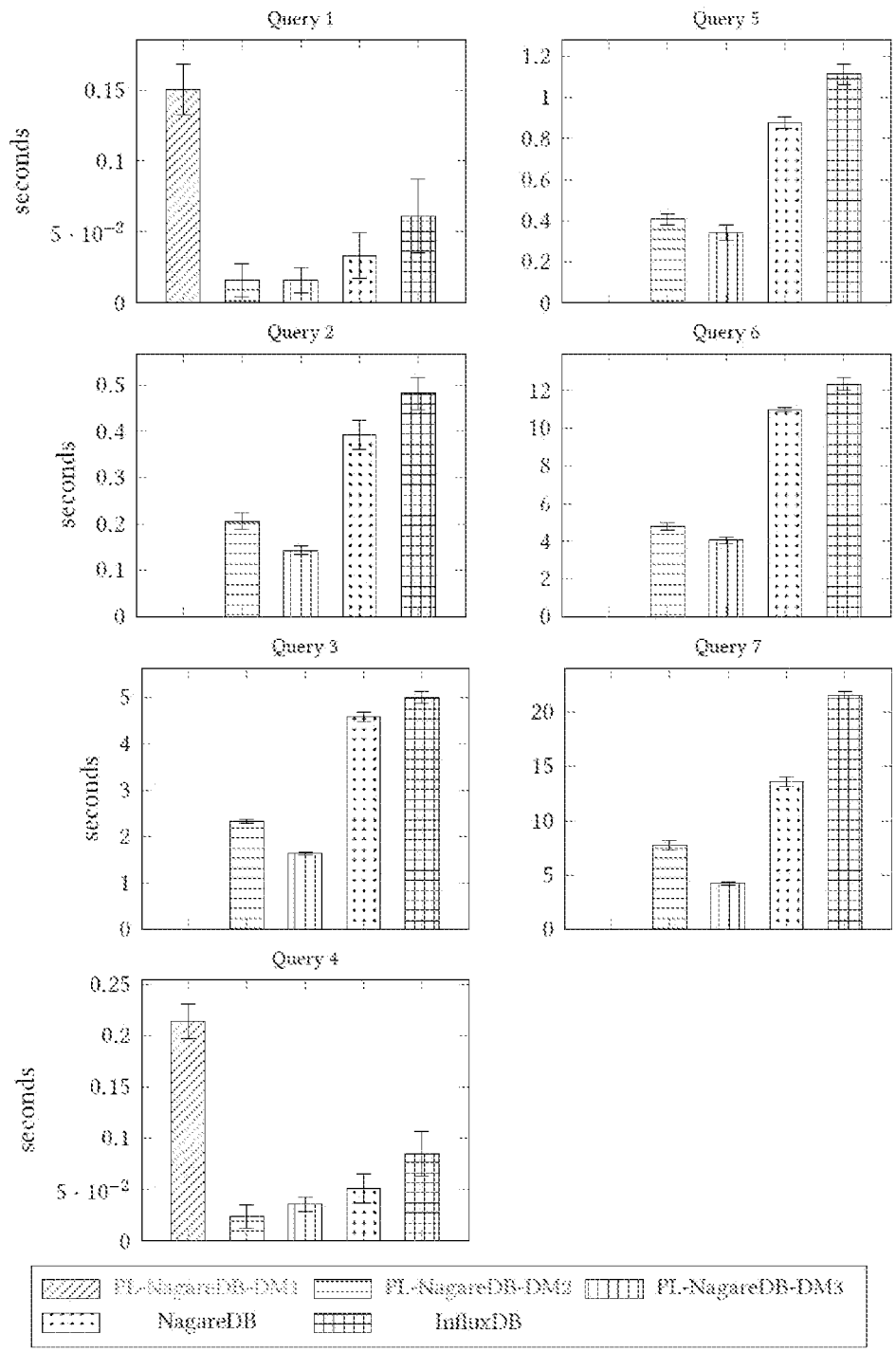
FIG. 8 shows the comparison of the timestamped querying response times for different data models of the method of the invention as well as for NagareDB and InfluxDB.

Regarding historical querying, as it can be seen in FIG. 8, PL-NagareDB is able to globally outperform InfluxDB and NagareDB significantly. In addition, this Figure shows some interesting insights: first, PL-NagareDB is generally significantly faster than InfluxDB and NagareDB with one single exception: when PL-NagareDB uses its first data model (Q1, Q4). This phenomenon is expected, since the DM1 is not intended to participate in historical queries, and it only holds

TABLE 2

Queries execution time in seconds: Average and 95% confidence intervals, plus median for MongoDB (last column).

| Query ID | PL-NagareDB-DM1 | PL-NagareDB-DM2 | PL-NagareDB-DM3 | MongoDB | MongoDB - MED |
|---|---|---|---|---|---|
| Q1 | 0.150 [0.141, 0.162] | 0.016 [0.011, 0.024] | 0.016 [0.013, 0.023] | 0.783 [0.397, 1.19] | 0.446 |
| Q2 | — | 0.206 [0.198, 0.219] | 0.143 [0.138, 0.15] | 1.636 [0.469, 3.706] | 0.472 |
| Q3 | — | 2.342 [2.316, 2.366] | 1.644 [1.623, 1.667] | 6.641 [5.713, 8.428] | 5.816 |
| Q4 | 0.214 [0.204, 0.225] | 0.024 [0.019, 0.031] | 0.036 [0.033, 0.041] | 0.888 [0.422, 1.401] | 0.502 |
| Q5 | — | 0.408 [0.391, 0.422] | 0.344 [0.321, 0.367] | 9.119 [7.927, 11.147] | 8.434 |
| Q6 | — | 4.791 [4.656, 4.902] | 4.052 [3.951, 4.184] | 32.192 [28.403, 39.578] | 28.472 |
| Q7 | — | 7.728 [7.411, 7,928] | 4.236 [4.165, 4.307] | 38.508 [30.443, 53.472] | 31.126 |
| Q8 | 0.008 [0.005, 0.011] | 0.107 [0.084, 0.131] | 0.466 [0.448, 0.483] | 0.497 [0.463, 0.545] | 0.476 |
| Q9 | — | 0.335 [0.316, 0.358] | 0.157 [0.145, 0.171] | 2.425 [1.459, 4.333] | 1.494 |
| Q10 | — | 1.925 [1.78, 2.074] | 1.785 [1.704, 1.859] | 32.966 [27.457, 43.554] | 27.871 |
| Q11 | 0.129 [0.121, 0.137] | 0.008 [0.007, 0.011] | 0.008 [0.005, 0.012] | 0.800 [0.316, 1.481] | 0.374 |
| Q12 | — | 1.003 [0.974, 1.029] | 0.547 [0.527, 0.565] | 1.662 [0.789, 3.379] | 0.818 |

Figure 7:
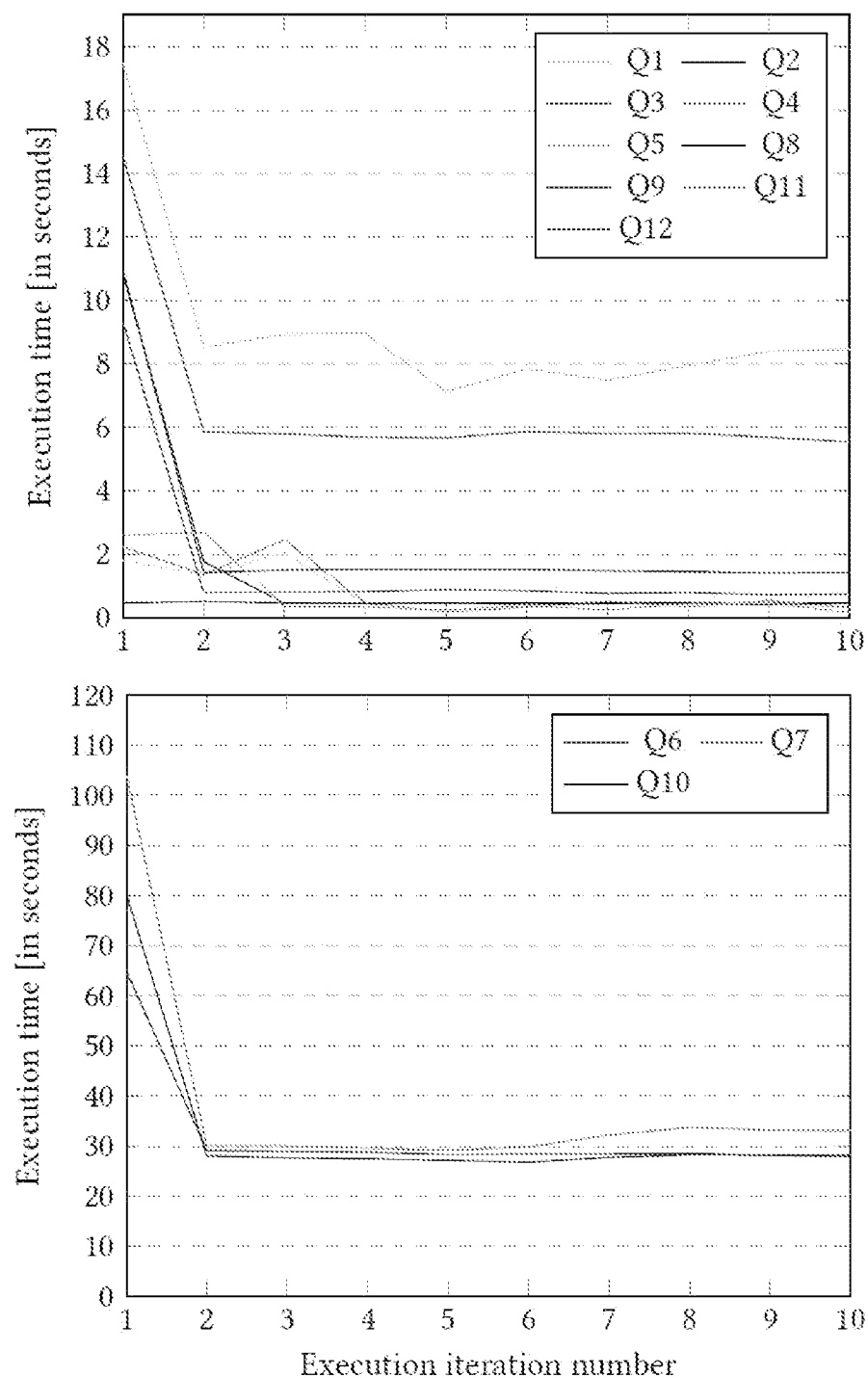
FIG. 7 shows the query response time evolution, in MongoDB, for the different types of queries that have been chosen as benchmarks.

This pattern can be seen in FIG. 7, where the first time a query is executed, it typically lasts longer. This happens even in the situation in which different data is requested in each iteration, as this benchmark is designed to. Thus, if consecutive queries are performed on distant data (regarding its disk position), or RAM is not big enough, queries are likely to behave often as in the first iteration, the costliest one, as it takes more time to complete. By contrast, if queries are repetitively performed over close data, and it fits in RAM, queries are likely to behave more often as in the second, and consecutive, iterations.

Thus, this cache-relying mechanism makes MongoDB to behave differently depending on the hardware, and on the use case. Conversely, the method of the invention limits the abstraction layer to the data that is being requested, as it is generated on-the-fly when users perform a query. This approach reduces the RAM resources needed, at the same time that offers more stable response times. As seen in Table 2, PL-NagareDB is able to execute the 12 proposed queries much faster than MongoDB, in average, while providing more stable results. Moreover, when taking into account MongoDB's best-case scenario (when the abstraction layer's data is already cached), it still falls broadly behind PL-NagareDB. This goes to the extent that Historical Queries (such as Q1 and Q4), run faster in PL-NagareDB's DM1 as much as one day of data. Instead, it is meant to improve ingestion and timestamped queries. However, even though historical queries are a worst-case scenario for DM1, its response time is relatively low, in absolute terms.

On the other hand, PL-NagareDB's DM3 efficiency increases along with the historical period requested, in comparison with DM2. This is expected and intended, since DM2 stores data in short columns, and DM3 in long columns, being able to benefit from sequential (and historical) reads much better. In contrast, when requesting short-ranged historical queries (Q1, Q4), based in random reads instead of sequential reads, DM2 outperforms DM3, which is, actually, one of the goals of DM2.

Finally, while PL-NagareDB's DM2 is identical to NagareDB's data model, it is able to retrieve data approximately 1.5 times faster. This phenomenon is explained by PLNagareDB's efficient Polyglot Abstraction Layers, that are able to reduce data transformation overheads.

Figure 9:
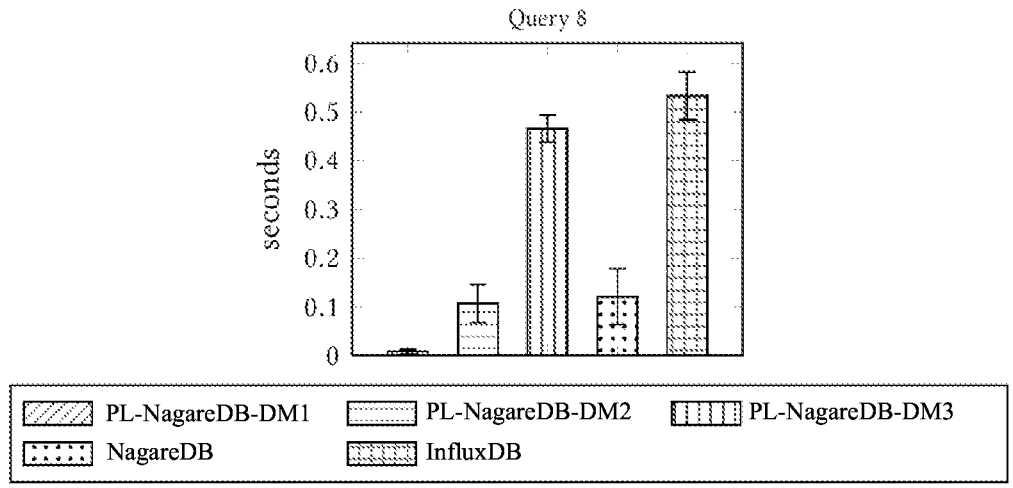
FIG. 9 shows the comparison of the historical querying response times for different data models of the method of the invention as well as for NagareDB and InfluxDB.

Regarding timestamped querying, as it can be seen in FIG. 9, PL-NagareDB is able to retrieve timestamped data globally faster than InfluxDB, in all of its possible data models. More precisely, PL-NagareDB's DM1 is able to solve timestamped queries more than 60 times faster than InfluxDB. This evidences that non-historical queries are greatly benefited from data models that do not follow a column-oriented approach, such as DM1, intentionally implemented following a key-value orientation.

PL-NagareDB's DM3, that follows a long-column orientation similar to InfluxDB, is able to solve timestamped queries slightly faster than it. As timestamped queries are a worst-case scenario for column-oriented data models, its efficiency is far lower than other data models, such as short-column oriented ones (NagareDB and PL-NagareDB's DM2) or Key-value oriented ones (PL-NagareDB's DM1).

PL-NagareDB's DM2 is able to provide good average results in terms of query answer time, not being as efficient as DM1, but neither as costly as DM3. This is intended and expected, as DM2 is built to be a generalist data bridge between the specialized data models (DM1 and DM3). Thus, it is expected to be globally good, while not standing out in any particular case.

Figure 10:
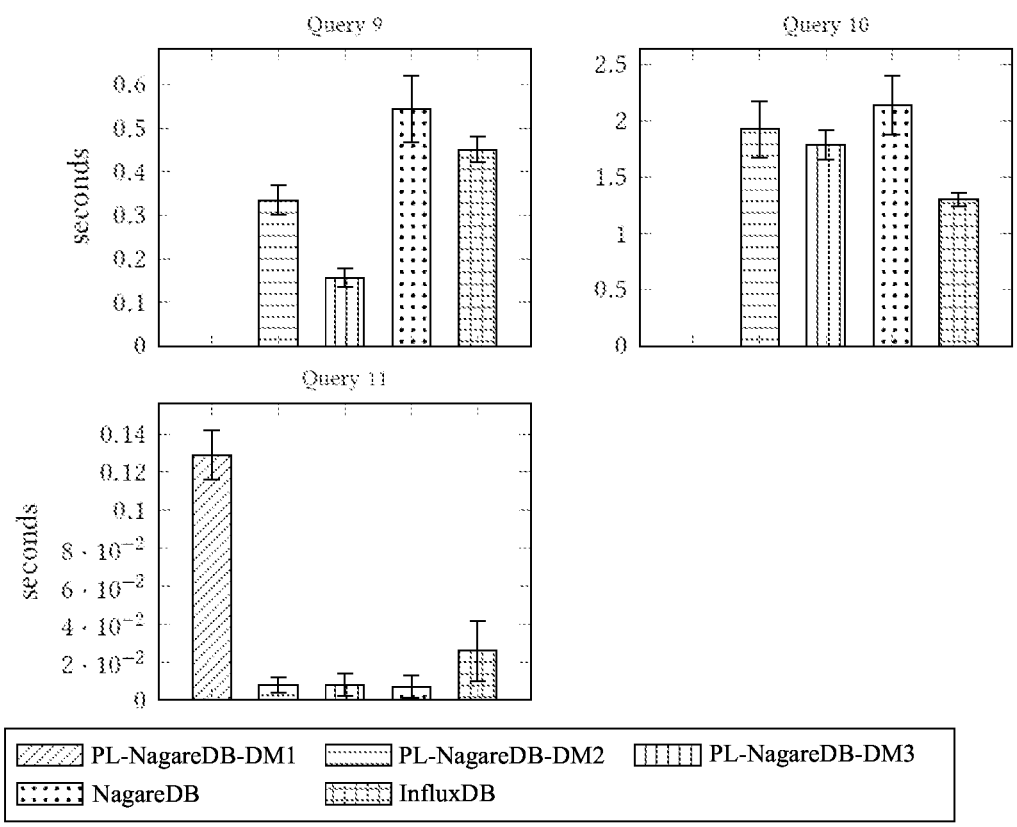
FIG. 10 shows a schematic representation of the third stage of method of the invention, according to a preferred embodiment thereof. In this case, the method comprises the use of a third data pool (3.1) in which data is organized according to a third, and final, data model.

Regarding aggregation querying, PL-NagareDB and InfluxDB show similar results, taking into account the global results, as seen in FIG. 10. In addition, PL-NagareDB is found to provide faster responses than InfluxDB and NagareDB when aggregating sensors one-by-one (Q9), while InfluxDB is found to be slightly faster when aggregating a set of sensors (Q10). PL-NagareDB's DM2 is found to be slightly faster than its sibling data model, the one of NagareDB. This is explained by the change in the behaviour with respect to timestamp generation.

PL-NagareDB's DM3 is found to be more efficient than DM2. This is expected, since aggregation queries are, actually, historical queries with further processing steps.

PL-NagareDB's DM1 falls behind all other PLNagareDB's data models (Q11), as its data model is not intended for querying historical data or performing aggregations in historical data. Although the difference might seem considerable, DM1 is just expected to keep as much as one day of data, the same amount of data that Q11 involves, making its total cost of 0.12 seconds relatively insignificant.

Figure 11:
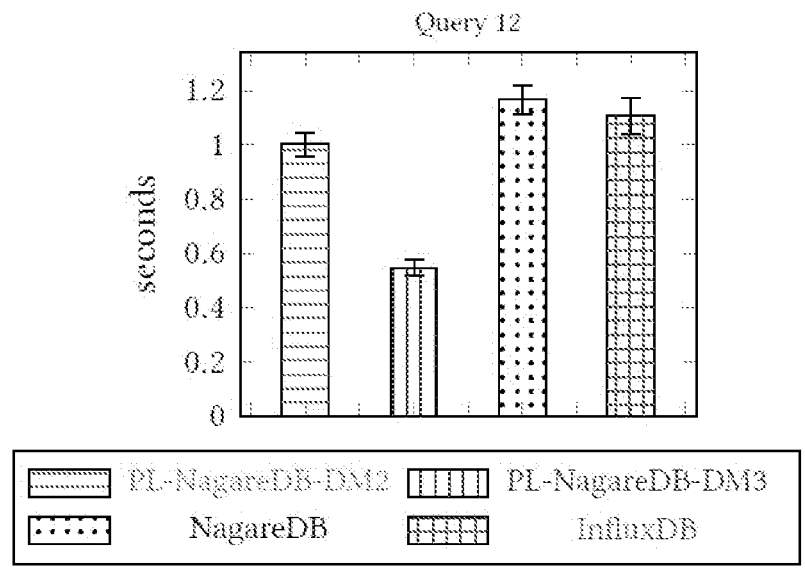
FIG. 11 shows the comparison of the inverted querying response times for different data models of the method of the invention as well as for NagareDB and InfluxDB.

Finally, regarding inverted querying, as seen in FIG. 11, PL-NagareDB's DM2 and DM3 are able to outperform both NagareDB's original implementation and InfluxDB. Also, the Figure shows some interesting insights. First and most importantly, PL-NagareDB's DM3 is the fastest one. This is due to its long-column orientation, that benefits from sequential reads, such as the ones that inverted queries perform, as they have to analyze every record in a time period, for later selecting the ones that meet certain condition.

PL-NagareDB's DM2 is twice as costly as DM3. This is due to the fact that DM2 keeps its data in short-columns, instead of long-columns, which implies that the disk has to perform further random-access operations. Although NagareDB's data model is identical to PLNagareDB's DM2, our approach is able to retrieve data slightly faster. This can be explained due to the miscellaneous re-configurations, explained in section IV-C. Thanks to them, PL-NagareDB only generates the timestamps that are going to be retrieved (the ones that meet certain value condition), instead to all the ones that are analyzed, as typically happens in NagareDB.

The experiments show that, in general, PL-NagareDB, NagareDB, and InfluxDB extensively outperform MongoDB. Moreover, PL-NagareDB is able to substantially surpass both NagareDB and InfluxDB in every query, with one single exception: when downsampling a subset of sensors (Q10), PL-NagareDB's falls slightly behind InfluxDB. In addition, the experiments confirm that the three data models of PLNagareDB work efficiently when they are expected to: Keyvalue data model (DM1) improve timestamped queries significantly, long-column data model (DM3) greatly improve historical querying, and short-column data model (DM2) effectively acts as a hybrid bridge between DM1 and DM3. Precise querying execution times can be found in Table 3.

Figure 12:
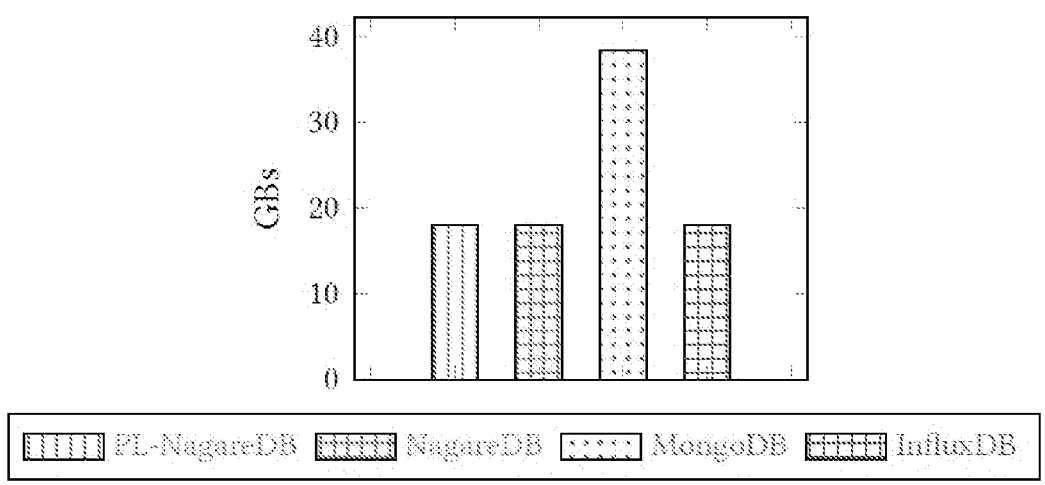
FIG. 12 shows the comparison of the storage usage of the method of the invention, of NagareDB, of MongoDB and of InfluxDB.

An important point to make reference to is that of storage usage. After ingesting the data, the disk space usage of the different database solutions is as shown in FIG. 12. MongoDB is the database that requires more disk space. This could be explained due its schema-less approach, and by its snappy compression mechanisms intended to improve query performance while reducing its compression ratio. Moreover, it keeps, per each data triplet, a unique insertion time identifier plus its generation timestamp. Conversely, the other database solutions do not require insertion time identifiers, and generation times are globally shared, keeping them just once, preventing timestamps repetitions. Thus, all other alternatives require similar disk usage, which could be explained by its shared pseudo-column-oriented data representation and by its powerful compression mechanisms.

Last, when comparing PL-NagareDB against its original and non-polyglot version, the storage usage does not have any significant difference. This is due to two different reasons: First, while PL-NagareDB has three different data models, the first one is only used for storing one day, out of the total 10 years. Secondly, although DM2 and DM3 represent different on-disk global structures (short-column and long-column, respectively), the document-based representation is the same in both data models, also coinciding with the NagareDB's data model.

On the other hand, and regarding data ingestion, the simulation is run along with one to five data shipping jobs, each shipping an equal amount of sensor values, in parallel. It is performed simulating a synchronized, distributed and real-time stream-ingestion scenario. Each write operation is not considered as finished until the database acknowledges its correct reception, and physically persists its write-ahead log, guaranteeing write operation durability. Thus, the faster the database is able to acknowledge the data safety, the faster the shipper will send the following triplet, or sensor reading, being able to finalize the ingestion of the data-set faster. Thus, the pace or streaming rate is naturally adjusted by the database according to its ingestion capabilities. In consequence, the performance metric is the average triplets writes/second.

Figure 13:
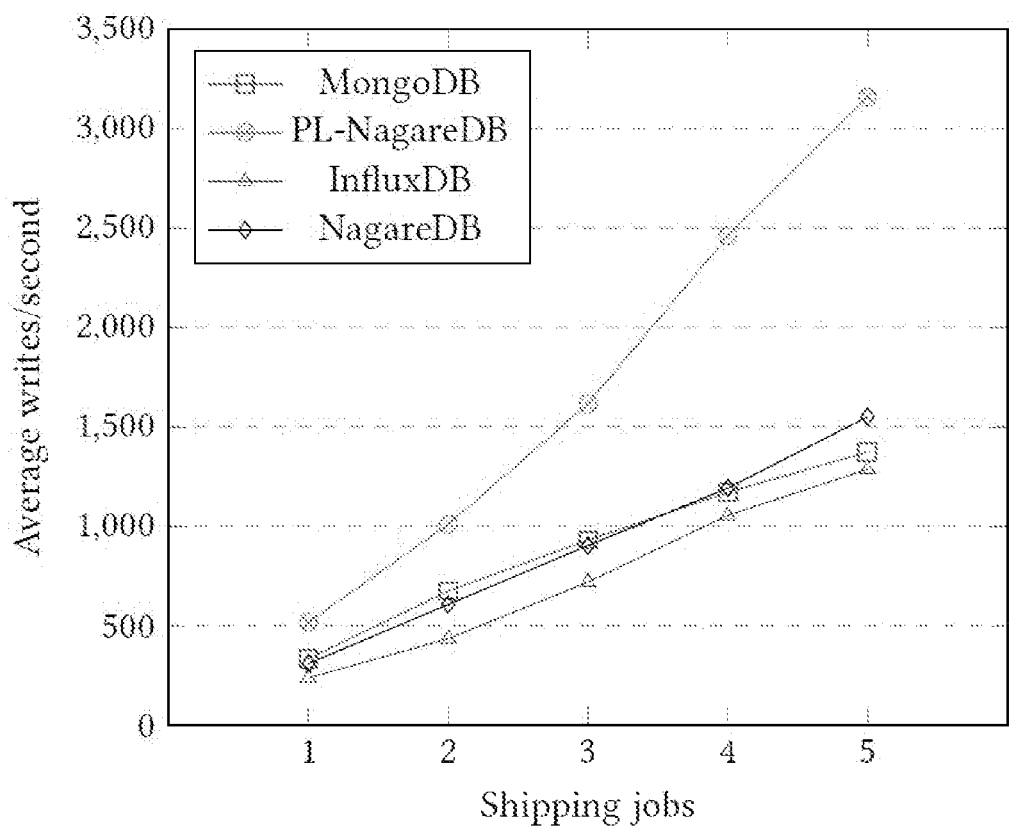
FIG. 13 shows the comparison of the scalability of ingestion with parallel jobs of the method of the invention, of NagareDB, of MongoDB and of InfluxDB.

As seen in FIG. 13, PL-NagareDB provides the fastest writes/second ratio, being able to ingest data twice as fast as the other solutions. This is due to the fact that it ingests data using the DM1, based on a key-value approach, in contrast to the other solutions, that implement column-oriented approaches. This is, in fact, one of the main goals of DM1, as it stores data triplets independently one from each other, whereas other solutions, such as NagareDB, keep their data in buckets, following a columnar shape. Thus, the key-value data model that the method of the present invention follows is found to be more suitable for ingestion-intensive applications, such as large monitoring infrastructures.

Finally, all databases show an efficient parallel ingestion speedup, as none of them reached the parallel slowdown point, when adding further parallel jobs reduces the system's performance. Moreover, PL-NagareDB seems to behave more efficiently in parallel ingestion scenarios, while, in contrast, both InfluxDB and MongoDB show a slight dropping tendency.

When focusing on data cascading, as the database is composed of three different data models, it is essential that data can efficiently flow from one to another, following its cascade data path. It is important to recall that there are two different moments in which the data must flow: From DM1 to DM2, and from DM2 to DM3. The first cascade is executed, by default, once per day, and the second one, once per month. Taking into account the set-up and the data set of this experiment, the data cascading from DM1 to DM2 took, on average, 2.25 seconds, being able to process approximately 320.000 readings per second. The second data cascade, from DM2 to DM3, took on average approximately 3 seconds. This fast data model conversions are mainly due to several design key aspects:

data bucketing: data is already separated into different buckets or collections, so that it is not necessary to perform any conditional search, being enough with performing a bulk read, translated into a disk sequential scan.

Internal operation. Thanks to the out and merge operations of MongoDB's aggregation framework, available from MongoDB 4.4, the database is able to perform in-database calculations, leaving the result directly into the database, relieving the application from transferring the data to its memory space.

Shared Logical Data Model. The conversion from DM2 to DM3 does not involve any kind of document altering action, and it is just based on a sort operation plus a bulk write. To sum up, this efficient data cascade provides the advantages of three different data models, being able to speed up both read and write operations, at a proportionally insignificant overhead cost, as the data cascade is only performed once a day, and once a month. For instance, if the cost of cascading from DM1 to DM2 is added to the ingestion times, no difference would be noticeable.

In summary, the present invention introduces the concept of Cascading Polyglot Persistence, consisting in using multiple consecutive data models for persisting data, where each data element is expected to cascade from the first data model, until eventually reaching the last one. Moreover, in order to evaluate its performance, this approach has been materialized, along with further optimizations, into an alternative implementation of NagareDB, a Time-Series database, comparing it against top tier popular databases, such as InfluxDB and MongoDB.

The evaluation results show that the resulting database benefits from the data-flow awareness, empowered by three different data models, at virtually no cost. In addition, it has been showed that good performance can be obtained without multiple software solutions, as it was implemented using a single database technology. More specifically, after evaluating the response times of twelve different common queries in time-series scenarios, the experimental results show that the polyglot-based data-flow aware approach, corresponding to the method of the invention, implemented as PL-NagareDB is able, not just to outperform the original NagareDB, but also to greatly outperform MongoDB's novel Time-series approach, while providing more stable response times.

Moreover, the benchmark results show that PL-NagareDB was able to globally surpass InfluxDB, the most popular time-series database. In addition, in order to evaluate its ingestion capabilities, a synchronized, distributed and real-time stream-ingestion scenario was simulated. After running it with different parallelization levels, PL-NagareDB showed to be able to ingest data streams two times faster than any of NagareDB, MongoDB and InfluxDB.

Finally, regarding its data storage consumption, InfluxDB, PL-NagareDB, and NagareDB have shown to request similar disk usage, being able to store two times more data than MongoDB, in the same space.

The invention claimed is:

1. A computer-implemented method for managing a flow of data in at least one database, wherein the flow of data comprises at least a first data flow portion, a second data flow portion and a third data flow portion, and said at least one database is configured with at least a first, a second and a third data models of data storage, and wherein the method comprises performing the following steps:
   a) receiving, during a first period of time, the first data flow portion in a computer;
   b) storing said first data flow portion in a first data pool of the at least one database according to the first data model;
   c) after the first period of time, cascading the first data flow portion from the first data pool to a second data pool in the at least one database and assigning the first data flow portion to the second data model;
   d) repeating steps a)-c) for at least the second data flow portion;
   e) repeating steps a)-c) for at least the third data flow portion; and
   f) after a second period of time, cascading the data from the second data pool to a third data pool in the at least one database, and assigning said data to the third data model.

2. The method according to claim 1, where at least the first, the second or the third data model comprises a key-valued model, a short-column model, or a long-column model.

3. The method according to claim 2, where the first data model comprises a key-valued model.

4. The method according to claim 2, where the second data model comprises a short-column model.

5. The method according to claim 2, wherein the third data model comprises a long-column model.

6. The method according to claim 1, wherein the first period of time is smaller than the second period of time.

7. The method according to claim 1, where the flow of data is provided by an IoT infrastructure, one or more sensors.

8. The method according to claim 1, wherein the first, the second or the third data pool is configured with at least two polyglot abstraction layers.

9. The method according to claim 1, comprising at least a first and a second database, wherein the first data pool is stored in the first database, and the second data pool is stored in the second database.

10. A computer comprising hardware and software adapted to perform a method according to claim 1.

11. An IoT system comprising a computer according to claim 10, communicatively connected to a plurality of IoT devices adapted to generate at least a flow of data and to send said flow of data to the computer.

12. The method according to claim 1, where the first, the second, and/or the third data model comprise in-disk organizations of the data.

13. A computer program product comprising one or more computer-readable hardware storage devices having thereon computer-executable instructions that are structured such that, when executed by one or more processors of a local computing system, cause the computing system to perform a method for managing a flow of data in at least one database, the method comprising:
   receiving, during a first period of time, a first data flow portion;

storing said first data flow portion in a first data pool of at least one database according to a first data model;

after the first period of time, cascading the first data flow portion from the first data pool to a second data pool in the at least one database and assigning the first data flow portion to a second data model;

repeating steps a)-c) for at least a second data flow portion;

repeating steps a)-c) for at least a third data flow portion; and after a second period of time, cascading the data from the second data pool to a third data pool in the at least one database, and assigning said data to a third data model.

14. A non-transitory computer readable medium containing instructions that when executed by at least one processor, cause the at least one processor to perform a method for managing a flow of data in at least one database, the method comprising:

receiving, during a first period of time, a first data flow portion;

storing said first data flow portion in a first data pool of at least one database according to a first data model;

after the first period of time, cascading the first data flow portion from the first data pool to a second data pool in the at least one database and assigning the first data flow portion to a second data model;

repeating steps a)-c) for at least a second data flow portion;

repeating steps a)-c) for at least a third data flow portion; and after a second period of time, cascading the data from the second data pool to a third data pool in the at least one database, and assigning said data to a third data model.

* * * * *

UNITED STATES PATENT AND TRADEMARK OFFICE
CERTIFICATE OF CORRECTION

| | | |
|---|---|---|
| PATENT NO. | : 12,130,793 B2 | Page 1 of 1 |
| APPLICATION NO. | : 18/120178 | |
| DATED | : October 29, 2024 | |
| INVENTOR(S) | : Carlos García Calatrava, Yolanda Becerra and Fernando Cucchietti | |

It is certified that error appears in the above-identified patent and that said Letters Patent is hereby corrected as shown below:

On the Title Page

Insert --(30) Foreign Application Priority Data
June 22, 2022 (EP) .................... 223825357--

Signed and Sealed this
Eighth Day of July, 2025

Coke Morgan Stewart
*Acting Director of the United States Patent and Trademark Office*